United States Patent
Shearer et al.

(10) Patent No.: US 6,883,333 B2
(45) Date of Patent: Apr. 26, 2005

(54) SENSORLESS CONTROL OF A HARMONICALLY DRIVEN ELECTRODYNAMIC MACHINE FOR A THERMOACOUSTIC DEVICE OR VARIABLE LOAD

(75) Inventors: Tony L. Shearer, Port Matilda, PA (US); Robert W. M. Smith, State College, PA (US); Heath F. Hofmann, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 10/706,550

(22) Filed: Nov. 12, 2003

(65) Prior Publication Data

US 2004/0095028 A1 May 20, 2004

Related U.S. Application Data

(60) Provisional application No. 60/426,048, filed on Nov. 12, 2002.

(51) Int. Cl.[7] .............................. F25B 9/00; F25B 1/00
(52) U.S. Cl. ........................................... 62/6; 62/228.4
(58) Field of Search ..................... 62/6, 228.4

(56) References Cited

U.S. PATENT DOCUMENTS

| | | | |
|---|---|---|---|
| 5,342,176 A | 8/1994 | Redlich | 417/212 |
| 5,389,844 A | 2/1995 | Yarr et al. | 310/15 |
| 5,857,340 A | 1/1999 | Garrett | 62/6 |
| 6,031,350 A | 2/2000 | Sidey | 318/599 |
| 6,176,683 B1 | 1/2001 | Yang | 417/44.1 |
| 6,289,680 B1 | 9/2001 | Oh et al. | 62/6 |
| 6,307,287 B1 | 10/2001 | Garrett et al. | 310/30 |
| 6,351,089 B1 | 2/2002 | Ibuki et al. | 318/128 |
| 6,583,593 B1 | 6/2003 | Iijima et al. | 318/254 |
| 6,614,137 B1 | 9/2003 | Joong et al. | 310/12 |
| 6,623,255 B1 | 9/2003 | Joong et al. | 417/411 |

OTHER PUBLICATIONS

Yaoyu, L., Minner, B., Chieu, G., Mongeau, L., and Braun, J., "Adaptive tuning of an electrodynamically driven thermoacoustic cooler", J. Acoust. Soc. Am., vol. 111, No. 3, Mar. 2002, pp. 1251–1258.

Hofler, T., "Accurate acoustic power measurements with a high–intensity driver", J. Acoust. Soc. Am., vol. 83, No. 2, Feb. 1988, pp. 777–786.

*Primary Examiner*—William C. Doerrler
(74) *Attorney, Agent, or Firm*—Gifford, Krass, Groh, Sprinkle, Anderson & Citkowski, PC

(57) ABSTRACT

The present invention provides a method of sensorless control of a linear reciprocating electrodynamic machine used for driving a thermoacoustic device, and/or a similar frequency dependent load. Sensorless control is accomplished by estimating the state of predetermined performance parameters at the linear machine through the use of a system model. Thereafter, the method comprises providing a control means operative to obtain the estimated performance parameters and cause manipulation of at least one input parameter to the linear machine such that desired performance parameters are obtained in view of the estimated performance parameters.

51 Claims, 9 Drawing Sheets

SENSORLESS CONTROL OF A HARMONICALLY DRIVEN ELECTRODYNAMIC MACHINE FOR A THERMOACOUSTIC DEVICE OR VARIABLE LOAD

REFERENCE TO RELATED APPLICATIONS

This patent application claims benefit from U.S. provisional patent application Ser. No. 60/426,048, filed Nov. 12, 2002, the entire contents of which are incorporated herein by reference.

FIELD OF THE INVENTION

The present invention relates to control techniques for reciprocating linear electrodynamic drive machines and, more particularly, to a method of sensorless control of a reciprocating linear electrodynamic drive machine for a thermoacoustic device.

BACKGROUND OF THE INVENTION

While it is known that sensorless control of rotary electrodynamic machines is possible, a number of novel linear machines and relatively new applications for the same have motivated the need for robust and cost-effective control methods.

One such new application where novel and effective control methods for linear machines is desired relates to thermoacoustic devices such as thermoacoustic refrigerators or similar applications where it may be desirable to track an acoustic resonance of the refrigerator for maintaining an optimum operating condition at the reciprocating linear electrodynamic machine.

It is appreciated that many thermoacoustic devices are designed to be co-resonant with the linear machine that drives the device. In other words, the thermoacoustic device is designed to perform optimally when the mechanical resonant frequency of the linear machine is equal to the resonant frequency of the thermoacoustic device. In practice, the acoustic resonance can be a function of the operating temperatures or the cooling load, and it is then desirable for the excitation provided to the machine, to be adjusted in a manner to re-optimize performance. Thus, knowledge of this functional relationship between the drive machine and the load device is required for one to control the performance of the combined system by controlling the excitation administered to the drive machine.

In conventional thermoacoustic refrigerators, for example, acoustic pressure and actuator displacement at the linear machine are typically monitored while a nominally harmonic drive frequency and amplitude (either voltage or current) is adjusted to achieve a desired operating point in view of these parameters. This desired operating point may illustratively correspond to an acoustic resonance at the load, maximum electroacoustic conversion efficiency between the linear machine and the load, maximum power delivery to the load, or to achieve some other desirable operating point for the thermoacoustic system.

Most often, pressure and displacement are monitored directly using sensors. However, U.S. Pat. No. 5,342,176 issued to Redlich discloses a method for obtaining the piston displacement in a free piston compressor for a linear electrodynamic machine using only the measured terminal current and voltage of the machine. Redlich's objective for obtaining the piston displacement through the disclosed method was primarily concerned with the control of the amplitude of the actuator in the linear machine. Such control is necessary to avoid collision with stationary parts of the linear machine, but not as a precursory step for controlling a thermoacoustic load, since the application is for use with a compressor where efficient compression requires as small as possible a space between the piston and the end of the compression space. Further, in the absence of a pressure or force determination, it is not possible to determine conditions such as an acoustic resonance, the machine efficiency, or to adjust for maximum power transfer.

U.S. Pat. No. 6,289,680 issued to Oh et al. discloses a method of controlling a linear motor used in a compressor application wherein force and displacement of the linear motor is mentioned, however, there is no suggestion that force or pressure may be extracted from the linear motor in a completely sensorless manner, and these dynamical parameters be used to provide a more robust and cost-effective control means.

Accordingly, there is a need for a method of sensorless control of a linear reciprocating electrodynamic machine that obviates the need for pressure and displacement transducers traditionally associated with the control of such machines that are commonly used for driving thermoacoustic refrigerators or similar frequency dependent loads.

SUMMARY OF THE INVENTION

The present invention provides a method of sensorless control of a device including a linear reciprocating electrodynamic machine used for driving a frequency dependent load, wherein sensorless control is accomplished by estimating dynamical parameters of the device through the use of a system model and thereafter manipulating at least one input to the linear machine to achieve a desired operating condition in view of the estimated dynamical parameters and the machine excitation.

The method for sensorless control begins with providing a thermoacoustic device including a linear electrodynamic machine communicating with a load device. The inputs to the machine include either the input current or voltage magnitude, and the input frequency, and these conditions are set to power the electrodynamic machine.

Next, the voltage and current signals at the input of the electrodynamic machine are determined by direct measurement, by knowledge of imposed input conditions or other conventional means known in the art.

Thereafter, positional and force parameters of the load device are estimated in a sensorless manner, from the system model and the current and voltage signals. It is appreciated that such estimating may be facilitated with system modeling via experimentation, mathematical methods, and/or combinations thereof. The system model only requires knowledge of the electrical and mechanical parameters of the linear machine, and not the load to which it transmits power.

The positional parameter to be estimated through sensorless means is preferably selected from the group consisting of displacement, velocity, and acceleration; and the force parameter is selected from the group consisting of force and pressure. As a group, these estimated parameters will be referred to as dynamical parameters.

The estimated dynamical parameters are used either alone or in concert with the obtained current and voltage and/or frequency, to determine at least one operating condition of the thermoacoustic device. The operating condition determined is an instantaneous operating condition that varies over time and with respect to changes in the load device.

Next, the process continues with determining a difference between the estimated operating condition and a desired operating condition. It is appreciated that the desired operating condition for the thermoacoustic device may be one selected from the group consisting of maximum efficiency, maximum power and phase angle between the estimated dynamical parameters, as well as other operating conditions. In the case of maximum efficiency, or maximum power, the desired operating condition may not be known a priori, but may be identified via a searching through the input conditions. Finally, the voltage, current or frequency input to the electrodynamic machine is adjusted so as to reduce the difference between the instantaneous operating condition and the desired operating condition. In the case of maximum power or efficiency, the desired operating condition is the maximum value, so the inputs are adjusted to seek the maximum value, generally within operating limits of the device.

BRIEF DESCRIPTION OF THE DRAWINGS

To further describe the nature and objects of the present invention, reference should be had to the following detailed description taken in conjunction with the accompanying drawings in which like parts are given like reference numerals and wherein.

DETAILED DESCRIPTION OF THE INVENTION

The present invention provides a method of sensorless control of a linear reciprocating electrodynamic machine used for driving a thermoacoustic device that includes a linear electrodynamic machine and a load device, such as a thermoacoustic refrigerator. However, it is appreciated that the sensorless control method described herein may be used with other devices with frequency dependent loads.

Generally, the performance of the thermoacoustic device is controlled by obtaining an estimation of at least one dynamical parameter which has a mathematical relationship to a desirable operating condition for the thermoacoustic device. Thereafter, the operating condition of the thermoacoustic device can be optimized by manipulating at least one input condition to the linear electrodynamic machine to achieve a desired operating condition relative to the estimated dynamical parameter.

The invention provides a sensorless control approach for a thermoacoustic device where the acoustic pressure and actuator displacement at the load of the system are accurately estimated by using a pre-developed system model and the voltage and current at the input terminals of the linear machine.

The exemplary embodiment, which we will call a first type of thermoacoustic device, herein relies on an operating condition at the thermoacoustic device in which it is desirable to maintain a relationship such that the acoustic pressure and actuator displacement are 90 degrees out of phase, to maintain an acoustic resonance. In another type of thermoacoustic device, which we may refer to as a second type of thermoacoustic device, a pure acoustic resonance is not present at the operating frequencies of interest, and it may rather be desirable to identify the condition of maximum efficiency of power delivery to the load. This condition is satisfied, when the ratio of the in-phase product of force and velocity (i.e. sensorlessly obtained dynamical parameters), divided by the in-phase product of current and voltage, is maximized, by changing the input conditions to the motor. Other types of thermoacoustic devices exist, which may have these or other desirable operating conditions as well.

Typically for thermoacoustic devices, measurements from pressure sensors, displacement sensors, accelerometers or other sensing devices are used to determine the dynamic operating states of system parameters. Thereafter, control methods are used to adjust one or more of the input parameters to the linear motor to achieve a desired operating point at the thermoacoustic device. Hence, it is appreciated that one can effect the sensorless control of a thermoacoustic device to obtain a desirable operating point by providing a method for accurately estimating these dynamical operating parameters and thereafter using the estimated parameters to make adjustments at the input of the thermoacoustic device to obtain a desired operating point.

Figure 1:
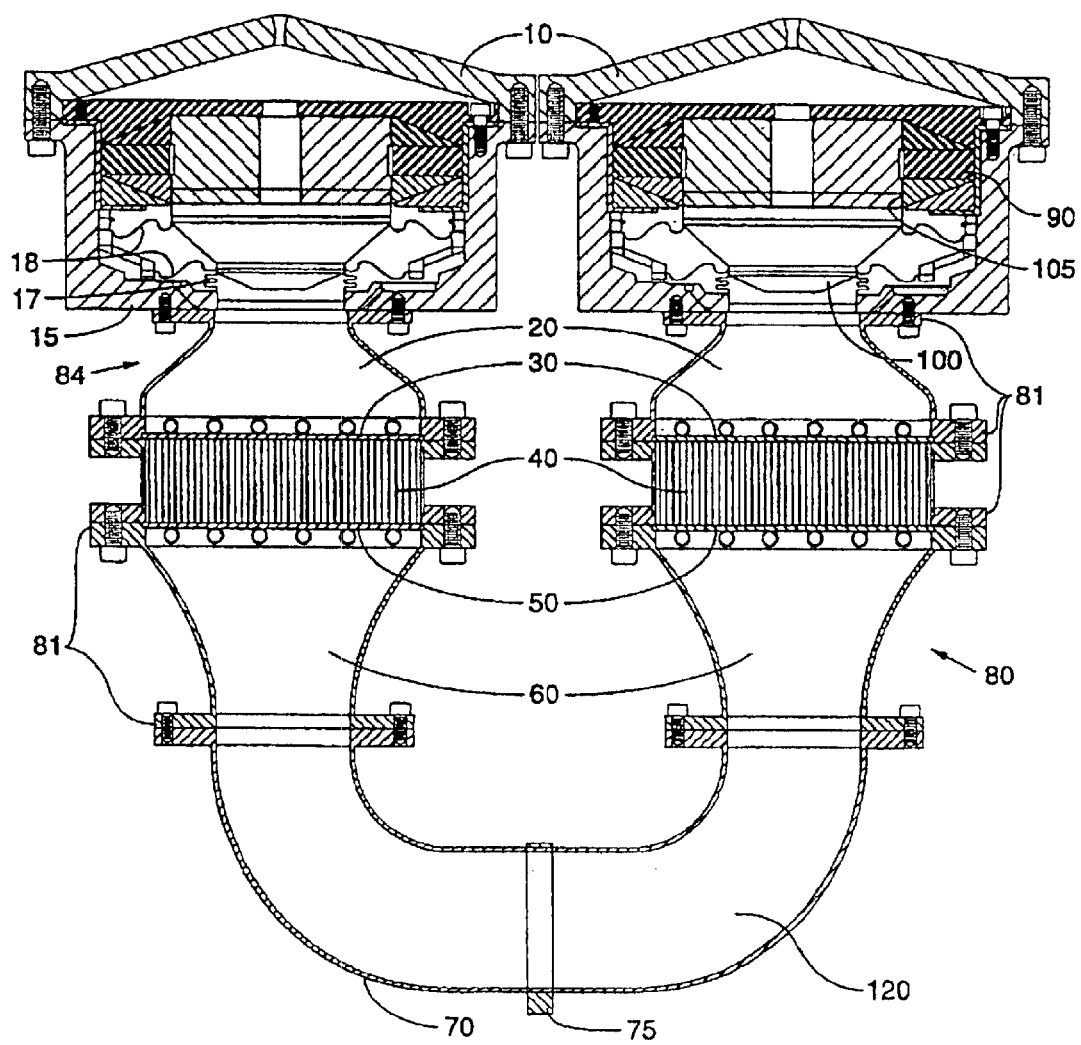
FIG. 1 is a cross-sectional view of an exemplary thermoacoustic device which may be used with the present invention.

A variety of thermoacoustic devices are known in the art. An exemplary embodiment of a thermoacoustic device that can be used with the present invention is shown in FIG. 1. This device is an example of the first type of thermoacoustic device mentioned above. FIG. 1 is taken from U.S. Pat. No. 5,647,216, the entire contents of which are incorporated herein by reference. A better understanding of this device may be had by reference to the incorporated patent. As shown, this thermoacoustic device is a double-ended device with drivers located at each end. Thermal components are located adjacent each driver, with the thermal components, including a stack, and a pair of heat exchangers at each end. The present invention may be used to control a device such as this, as well as other thermoacoustic devices.

Figure 2:
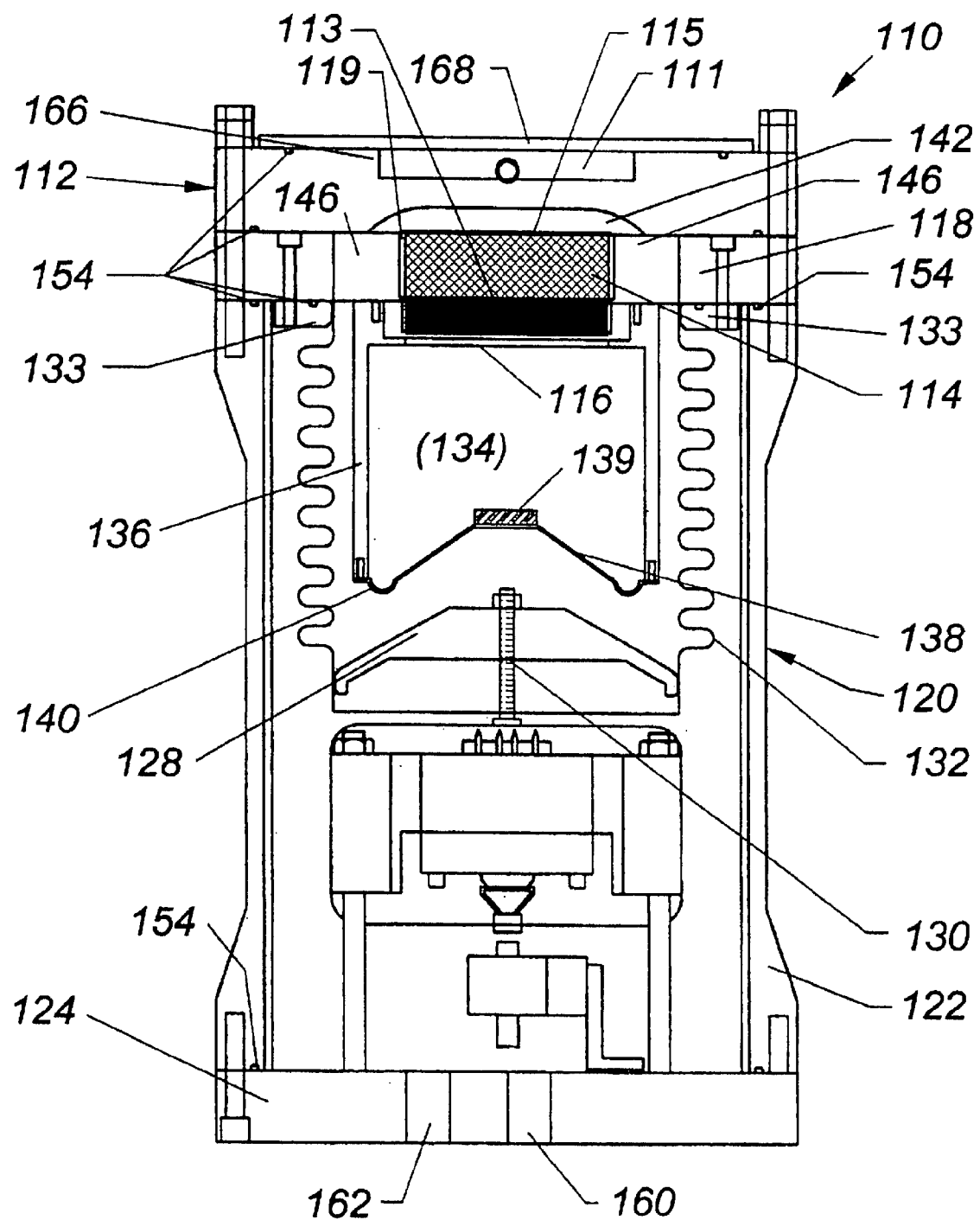
FIG. 2 is a cross-sectional view of another exemplary thermoacoustic device which may be used with the present invention.
Figure 3:
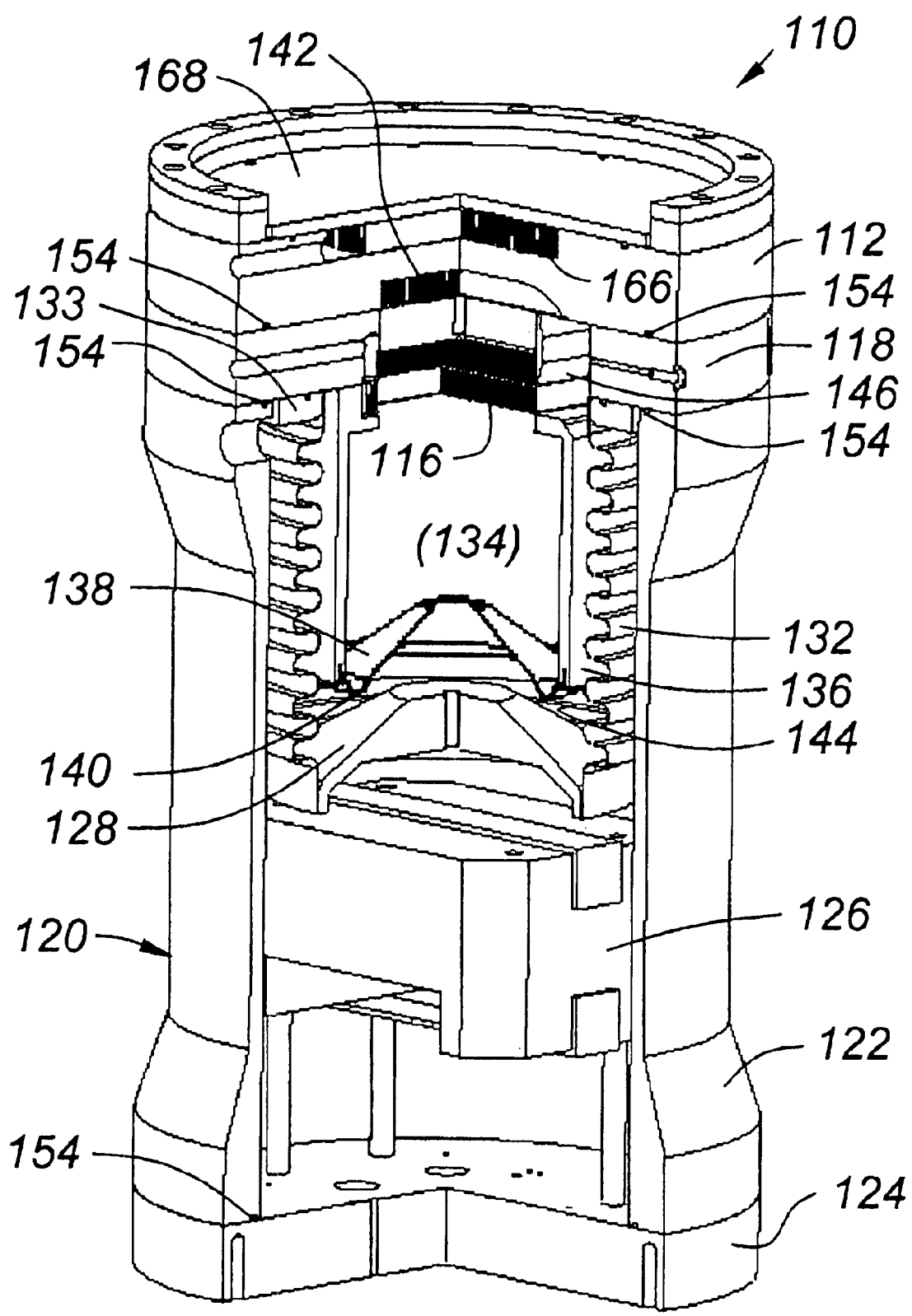
FIG. 3 is a sectioned perspective view of the thermoacoustic device of FIG. 2.

An example of the second type of thermoacoustic device discussed above is shown in FIGS. 2 and 3. FIG. 2 shows a cross-sectional side view of the thermoacoustic device 110. FIG. 3 shows the same thermoacoustic device 110 with portions cut away, and some components left out of the view for simplicity. The thermoacoustic device of FIGS. 2 and 3 is the subject of pending U.S. patent application Ser. No. 10/410,492, the entire contents of which are incorporated herein by reference. A more complete understanding of this device may be had by reference to the incorporated patent application. Additional thermoacoustic devices are discussed in pending U.S. patent application Ser. No. 10/409,855, the entire contents of which are incorporated herein by reference. The present invention may also be used to control one of these devices.

The thermoacoustic device shown in FIGS. 2 and 3 will now be discussed in more detail, to give an understanding of this type of thermoacoustic device. The device 110 is designed to produce a refrigeration effect by absorbing heat through a unitized cold head heat exchanger 112 and delivering that heat at a lower temperature to a regenerator 114, contained in a thermally-insulated and thermally insulating support or platform 118. The energy in sound waves is used to pump that heat up to a higher temperature at the hot end of the regenerator 114. This heat, plus any acoustic energy deposited by the thermoacoustic heat pumping process, is deposited on the hot heat exchanger 116. The heat deposited on the hot heat exchanger 116 is exhausted from the system by hot heat exchange transport fluid that passes through the heat exchanger 116.

The components of the thermoacoustic device 110 are preferably housed in a pressure vessel 120. The pressure vessel 120 is formed by a generally cylindrical wall or shell 122 that is closed on its "lower" end by a base plate 124. It should be noted that descriptors such as "upper" and "lower" are used merely for ease of description of the figures, but are not limiting on the configuration or positioning of this device. In fact, the device FIGS. 2 and 3 is preferably operated in an inverted position as compared to the illustrated position. It can also be oriented in other positions. The position descriptors used herein refer to the illustrated orientations. The upper end of the wall or shell 122 is closed off by the combination of the platform or support 118 and the cold head heat exchanger 112, as will become more clear with respect to the further description of the cold head heat exchanger 112 herein below.

A linear motor 126 is attached to the bottom plate 124 and the moving portion of the linear motor 126 is connected to the main piston or power piston 128 by a connecting member 130. A bellows 132 extends between the power piston 128 and the support 118. This defines part of a compliant enclosure, in accordance with the disclosure in U.S. provisional patent application Ser. No. 60/372,008, the entire contents of which are incorporated herein by reference. As the power piston 128 moves upwardly, the working fluid in the compliant enclosure is compressed, and as the power piston 128 moves downwardly, the working fluid in the compliant enclosure is decompressed.

A multiplier volume 134 is defined inside the compliant enclosure. This multiplier volume 134 is defined by a multiplier cylinder 136, which has an upper end attached to the support 118 and a lower end closed off by a multiplier cone or piston 138. A flexible seal 140 interconnects the cone or piston 138 with the cylinder 136. As the multiplier cone 138 moves upwardly and downwardly, the volume of the multiplier volume, and the pressure of the gas contained therein, is increased and decreased.

The volume of working fluid inside the compliant enclosure and outside the multiplier volume 134 may be referred to as the main volume 144. The main volume 144 and the multiplier volume 134 are in fluid communication through the thermal components. That is, a fluid path is defined from the multiplier volume 134, through the hot heat exchanger 116, through the regenerator 114, through the fins 142 of the cold heat exchanger 112, and through windows 146 in the support 118. Therefore, gas can flow from the main volume 144 through the windows 146, make a U-turn through the fins 142, and enter the regenerator 114. In operation, the multiplier piston 138 and power piston 128 move generally in phase or close to being in phase with one another. Therefore, flow of gas between the multiplier volume 134 and main volume 144 is limited, since a pressure wave converges and diverges from both "sides" of the regenerator 114. As will clear to those of skill in the art, the device 110 allows for efficient refrigeration.

Turning again to the present invention, the first step in performing the inventive method is to capture the pertinent electrical, mechanical, and acoustical dynamics of the thermoacoustic device for developing a system model. The thermoacoustic device may be any of those just described, or other devices now known or yet to be developed. In accomplishing this step, particular terms may be included or neglected in the model that are found to be unique to the linear machine comprised in the thermoacoustic device. However, it is appreciated that the methodology used to obtain the system model is intended to remain general.

Electrical Model

The electrical dynamics of the linear machine can be expressed as:

$$v_t = iR_e + \frac{d\lambda(x, i)}{dt},$$

where $v_t$ is the voltage excitation at the terminals of the machine, $i$ is the stator current, $R_e$ is the stator winding resistance, and $\lambda$ is the flux linkage. Notice in the above equation that core losses such as hysteresis and eddy current losses have been omitted. For a given core material, hysteresis losses typically vary linearly with frequency while eddy losses usually vary with frequency squared. Also, the winding resistance $R_e$ can reflect frequency dependent losses due to skin and proximity effects or other effects and can be determined empirically. Frequency dependent resistance losses can be added to the model if their effect is determined to be significant.

The flux linkage of the linear machine could be a function of displacement, current, and even air gap. The radial air gap for the linear-electrodynamic machine considered here is relatively constant and it is not expected to impact the flux linkage and can be neglected. Assuming linear magnetic materials, saturation of the core is neglected, but this too can be modeled or evaluated empirically when deemed significant.

The total flux linkage can be expressed as the flux linkage due to the self inductance of the windings $L_e$ and the permanent magnet flux-linkage $\lambda_{pm}$:

$$\lambda(x,i) = L_e(x)i + \lambda_{pm}(x).$$

The machine's back emf $d\lambda(x,i)/dt$ is described below as:

$$\frac{d\lambda(x, i)}{dt} = L_e(x)\frac{di}{dt} + \left(i\frac{\partial L_e(x)}{\partial x} + \frac{\partial \lambda_{pm}(x)}{\partial x}\right)\frac{dx}{dt}.$$

The position-dependent component of magnetic co-energy $W_{fld}$ can be expressed as:

$$W'_{fld}(x, i) = \int \lambda(x, i) di$$

$$= \int L_e(x)i\,di + \int \lambda_{pm}(x)\,di$$

$$= \frac{1}{2}L_e(x)i^2 + \lambda_{pm}(x)i.$$

Hence, the interaction force $f_{fld}$, between the permanent magnet field and the stator magnetomotive force (mmf) is:

$$f_{fld}(x,i) = \frac{\partial W'_{fld}(x,i)}{\partial x} = \frac{1}{2}\frac{\partial L_e(x)}{\partial x}i^2 + \frac{\partial \lambda_{pm}(x)}{\partial x}i.$$

The first term in $f_{fld}$ is the reluctance force. In a properly designed machine the reluctance force should be small, as the inductance is assumed to be independent of actuator displacement.

$$\frac{\partial L(x)}{\partial x} \approx 0.$$

With reluctance forces neglected, $f_{fld}$ becomes, $$f_{fld}(x,i) = \frac{\partial \lambda_{pm}(x)}{\partial x}i.$$

The change in permanent magnet flux linkage with respect to displacement is often assumed to be constant and referred to as Bl.

$$Bl = \left(\frac{\partial \lambda_{pm}(x)}{\partial x}\right)$$

The expression for the magnetic force applied to the actuator therefore simply becomes:

$$f_{fld} = \frac{\partial \lambda_{pm}(x)}{\partial x}i = Bli.$$

Using $\lambda_{pm}$, $d\lambda(x,i)/dt$, Bl and it follows that the electrical dynamics in $$v_t = iR_e + \frac{d\lambda(x,i)}{dt},$$

can be expressed as:

$$v_t = iR_e + L_e\frac{di}{dt} + Bl\frac{dx}{dt}.$$

Mechanical Model

The mechanical dynamics of the driver, bellows, and spring configuration can be modeled accurately with the traditional single degree of freedom mass, spring, and damper system. The spring constant is represented by $K_m$ or, alternatively, compliance $C_m=1/K_m$, actuator moving mass as $M_m$ and the mechanical damping is represented by a dashpot with damping constant $R_m$. Core losses, due to the interaction of the permanent magnet flux with the stator iron, can be modeled as part of the mechanical damping. The mechanical and acoustical dynamics are coupled by an actuating piston having effective area A. The result is an acoustical pressure $p_a$ in the resonator at the piston location, with an attendant reaction force on the piston equal to the product $p_a A$. The velocity $v_m = dx/dt$, with which the piston moves corresponds to a volume velocity $u_a = Av_m = Adx/dt$ in the acoustical chamber. The forces related to the spring, mass, damper, and external acoustic action are:

$$f_s = K_m(x - x_0),$$

$$f_m = M_m\frac{d^2 x}{dt^2},$$

$$f_d = R_m\frac{dx}{dt},$$

$$f_a = Ap_a,$$

where $x_0$ is the equilibrium value of x with the spring unstretched. The spring is assumed to be linear and is operated around the equilibrium point of $x_0=0$. The mechanical dynamics can be represented as the sum of the forces:

$$f_{fld} = Bli = M_m\frac{d^2 x}{dt^2} + R_m\frac{dx}{dt} + K_m x + Ap_a.$$

The acoustical impedance is $Z_{acs}=p_a/u_a$, and when referred to the mechanical mobility domain using the effective piston area of the bellows, the acoustical system can be represented as:

$$\frac{1}{Z_{acs}A^2}.$$

Figure 4:
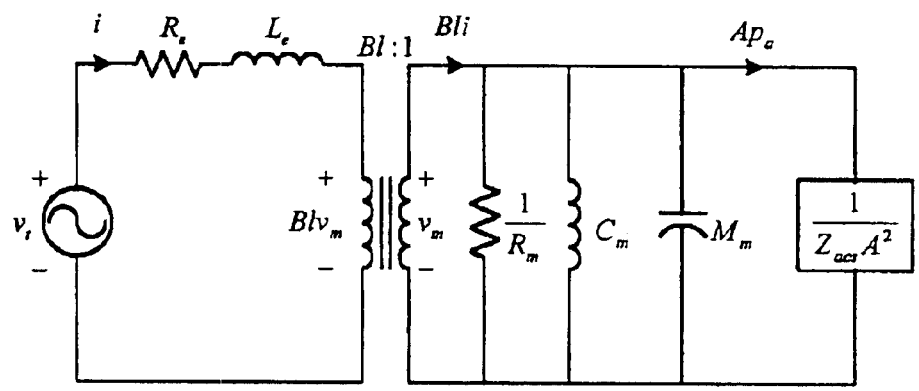
FIG. 4 illustrates an electrical equivalent model of a thermoacoustic system.

FIG. 4 shows an electrical equivalent model that represents the thermoacoustic system.

Estimating State Variables

The dynamic states of acoustic pressure and actuator displacement (the dynamical parameters) are needed, in the case of the first type of thermoacoustic device, to track the acoustical resonance with a PLL (phase locked loop). However, as noted earlier, it is appreciated that one may desire to effect a different optimum operating condition for the system which would require different and/or other parameters (such as input conditions at the linear motor), in addition to a different control means. An example of the just mentioned kind, as noted earlier, applies to a thermoacoustic device of the second type, wherein one may desire to control for maximum efficiency, and this requires the dynamical parameters force and velocity, and the motor input voltage and current. Therefore, in general, the inventive method requires that at least one dynamical parameter be selected from the model for use in determining the instantaneous operating condition of the system. Thus, in the exemplary embodiment, acoustic pressure and actuator displacement are selected as the dynamical parameters. The next step in the inventive method for sensorless control of the linear machine involves accomplishing accurate and reliable estimations of these dynamical parameters.

The selected dynamical parameters can be estimated using the physical model and knowledge of the input terminal voltage and current. In this case, the input terminal voltage and current signals represent parameters at the linear machine that have a functional relationship to the pressure and displacement, which depends on the load condition, that allows for accurate and reliable estimations to be obtained for the latter. In particular, in the case of maintaining an acoustic resonance, a known phase relationship between the pressure and displacement is desired, thus the input frequency is can be adjusted to achieve this.

Thus per the general inventive method, the at least one input condition is set to an initial value and thereafter is adjusted to obtain the desired optimum operating condition in view of the estimated dynamical parameters.

Hence, by manipulating the equation $$v_t = iR_e + L_e \frac{di}{dt} + Bl \frac{dx}{dt}$$

wherein the time varying voltage and current represent the at least one input condition, the displacement can be estimated as:

$$\hat{x} = \frac{1}{Bl}\left[\int (v_t - iR_e)dt - L_e i\right]$$

Once displacement is known, using the equation:

$$f_{fld} = Bli = M_m \frac{d^2 x}{dt^2} + R_m \frac{dx}{dt} + K_m x + Ap_a,$$

pressure can be estimated as:

$$\hat{p}_a = \frac{1}{A}\left(Bli - M_m \frac{d^2 \hat{x}}{dt^2} - R_m \frac{d\hat{x}}{dt} - K_m \hat{x}\right).$$

The electro-mechanical parameters $R_e$, $L_e$, $Bl$, $M_m$, $R_m$, and $K_m$ can be found experimentally with least-squared curve fitting utilizing measured values of $v_t$, $i$, $x$, and $p_a$ over the expected operating frequency range, and in general can be functions of amplitude and frequency.

Actual signals are non-ideal and have small amounts of high frequency noise, and inherent dc offsets contribute to various circuit errors. The latter is especially true when the motor excitation is only approximately sinusoidal, as when driven by a pulse-width modulated signal. This can make the estimated pressure and displacement difficult to implement directly. If a signal with a dc component is integrated, the output of the integrator is unbounded, and likewise differentiators yield similar results for input signals with high frequency components. Since the frequency range of operation of a device controlled using the present invention is typically small, band-pass filters are used to attenuate all frequencies outside the narrow expected operating range. The filters delay the signal, which results in a phase shift, but care is taken to use the same filter for current and voltage reference signals during comparisons, thus producing an equal delay in all signals. If one signal does not require filtering, it is delayed to match the delay imposed by filtering the other signal.

Voltage Frequency Control

As discussed previously, it is desirable that the device described in this exemplary embodiment be operated at the acoustical resonance frequency.

Typically for thermoacoustic devices, measurements from pressure sensors, displacement sensors, and accelerometers are used to determine the time varying state of these parameters. Based on this parametric information, the voltage excitation $\tilde{v}_{des}$ to the linear machine can be adjusted until the desired states are achieved. To excite the acoustical resonance of the system, the frequency of the excitation voltage $\tilde{v}_{des}$ at the linear machine must be the same as the acoustical resonance frequency. It is appreciated that during normal operation of a thermoacoustic refrigerator the acoustical resonance frequency can change due to temperature changes in the thermodynamic working fluid gas, changes in the cooling load, or with changes in the inlet and outlet temperatures to cause the acoustic resonance frequency to depart from the excitation voltage frequency. As a result, the excitation voltage must be adjusted and made equal to the acoustic resonance frequency. Thus, the next step in the inventive method involves providing a control device capable of recognizing a difference between the instantaneous operating condition and a desired operating condition, and adjusting the excitation voltage frequency at the linear machine such that the desired operating condition (acoustical resonance frequency) of the linear machine is accurately and efficiently obtained.

At the acoustical resonance, the pressure at the piston face and the volume velocity of the gas are in-phase. Hence, the pressure and displacement are 90 degrees out of phase. Since it is desired that pressure and displacement be 90 degrees out of phase, the simplest and arguably the most effective controller is the PLL (Phase-Locked-Loop) controller. This controller only provides the frequency, as the amplitude of the VCO (Voltage-Controlled Oscillator) output is controlled separately. The magnitude of the desired voltage $\|\tilde{v}_{des}\|$ is dependent on the cooling load temperature and not the operating frequency, and represent a second input condition which could also be varied, depending on the desired operating condition.

Figure 5:
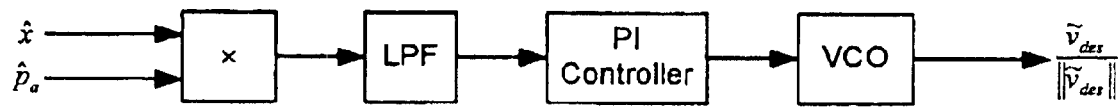
FIG. 5 generally illustrates a block diagram of a tracking circuit for tracking the electrical acoustical frequency of a thermoacoustic device wherein the tracking circuit comprises a phase lock loop controller.

FIG. 5 provides a schematic representation of usage of the estimated displacement $\hat{x}$ and the estimated pressure $\hat{p}_a$ to drive the frequency of the excitation voltage to the acoustical resonance frequency. In FIG. 5, LPF represents a low pass filter, which is used to select the time averaged component from the product of the estimated displacement and pressure, and the "PI Controller" represents a standard proportional-integral controller, used to provide a control signal to the voltage controlled oscillator (VCO). The VCO controls the system excitation frequency, thus closing the control loop since the latter impacts the relationship between $\hat{x}$ and $\hat{p}_a$.

Preferably, the method of sensorless control as according to the invention may be used to obtain a plurality of operating conditions in view of the dynamical parameters. Such conditions may illustratively include maximum power at the load, maximum pressure or force, or a desired phase relationship between dynamical parameters.

Illustration of Performance

Figure 7:
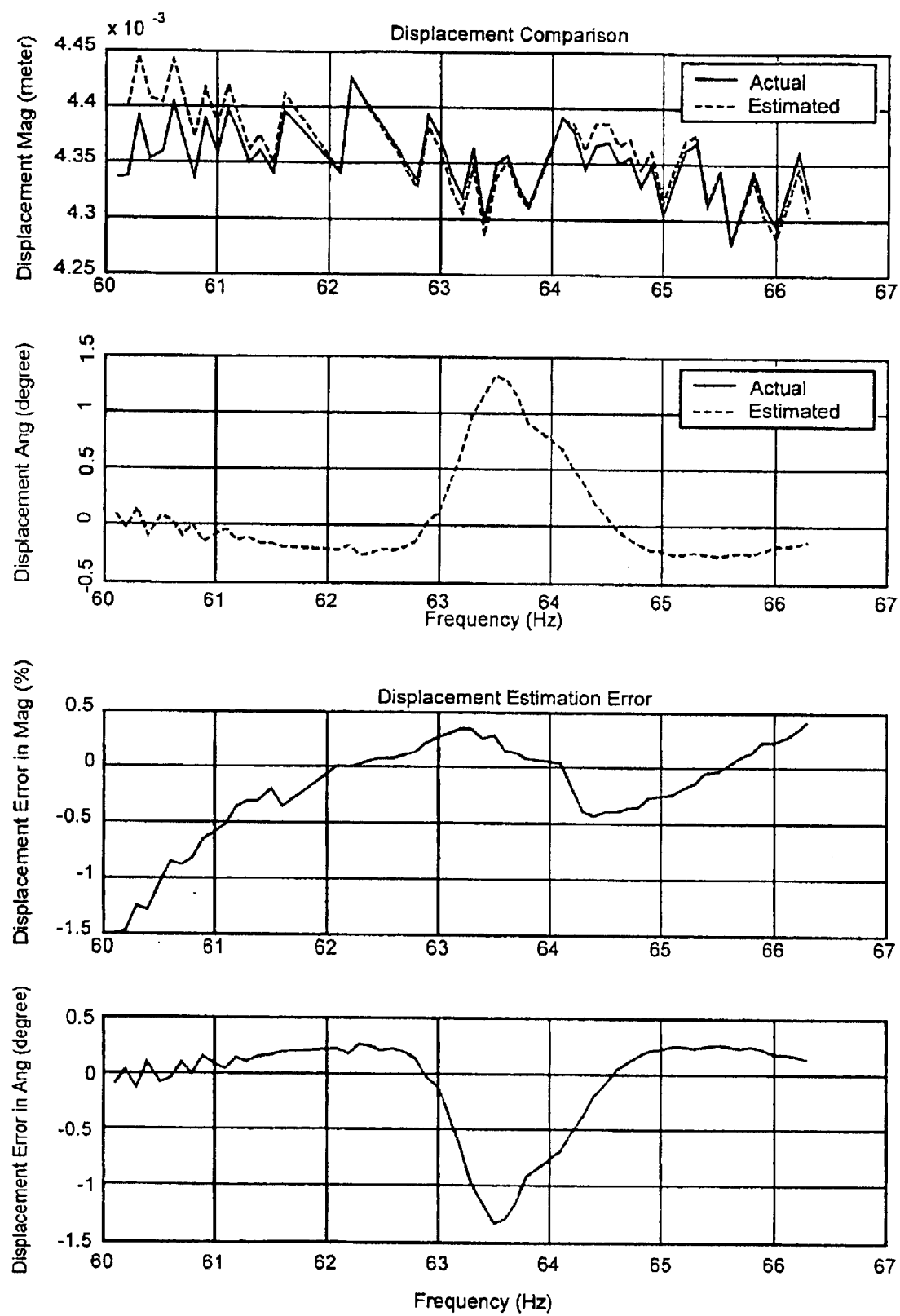
FIG. 7 illustrates a comparison chart of the estimated displacement and sensor obtained values for the same.

As explained in the 'detailed description of the invention', to improve the agreement between measured and estimated values, the implementation of the position estimation can be modified based on the empirical observations, to include higher order terms in current that may be associated with non-linearity in the magnetic materials, and the frequency dependent resistance mentioned earlier. Such an implementation was used on a linear motor very similar to that described in "Linear Electrodynamic Machine" U.S. Pat. No. 5,389,844, to operate a thermoacoustic device (of the first type) described in the exemplary embodiment, wherein tracking of the acoustic resonance was desired. So, the modified position estimation for FIG. 7 below is:

$$\hat{x} = \frac{1}{Bl}\left[\int (v_t - iR_e - \omega L_{imag}i)dt - L_e i + k_1 i^3 + k_2 i^5\right],$$

with $k_1$ and $k_2$ representing small, non-complex constants. The second modification observable in comparison with the estimated position is the explicit inclusion of a linear frequency dependence in the effective coil resistance. In the process of parameter extraction, the coefficient of the linear frequency dependent resistance appears as the imaginary component of the inductance, so the additional frequency dependant resistance is here represented by the product of $L_{imag}$, and $\omega$, the operating frequency in radians/sec.

Figure 6:
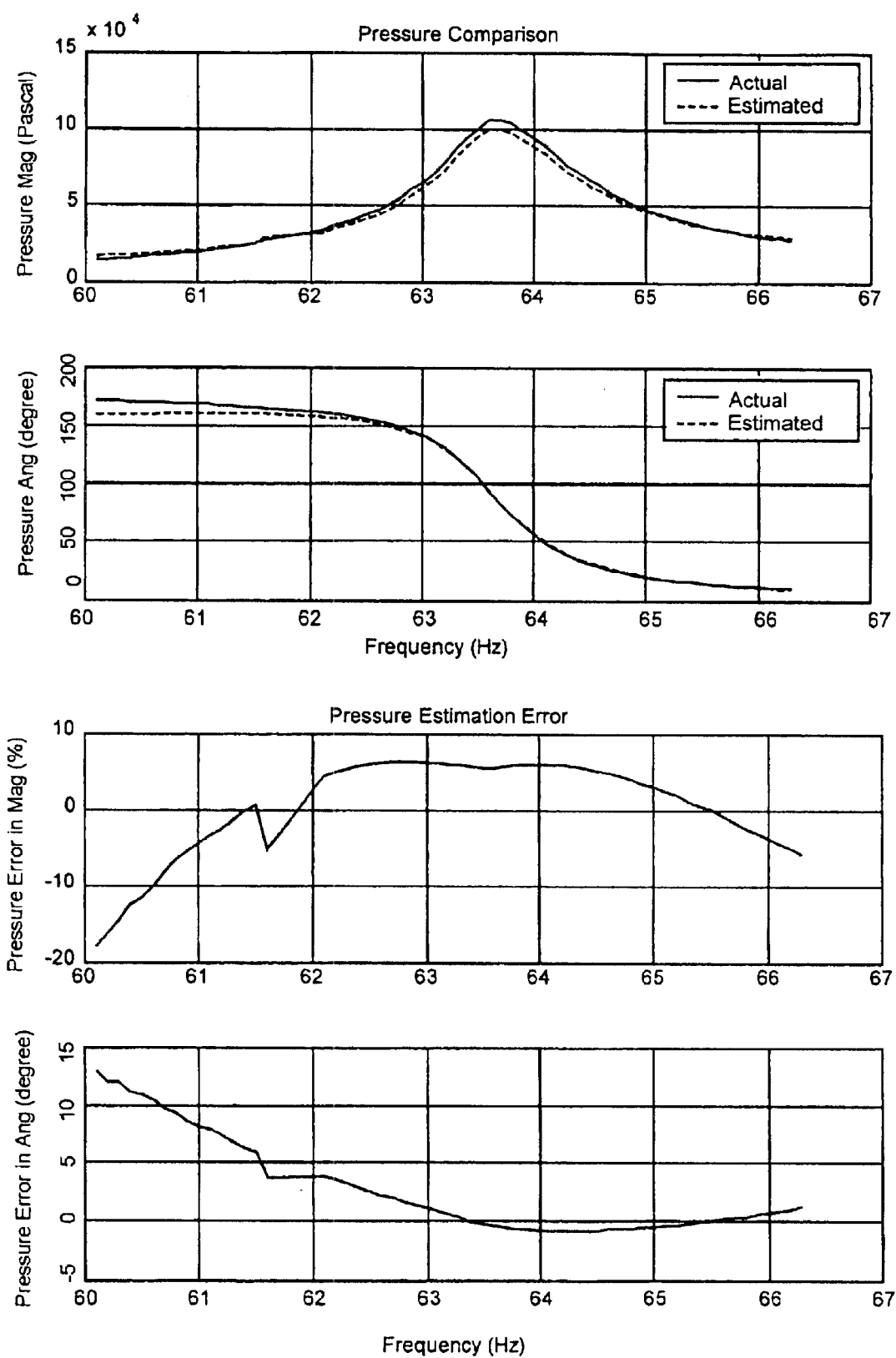
FIG. 6 illustrates a comparison chart of estimated acoustic pressure and sensor obtained values for the same.

The graphs in FIG. 6 provide a comparison of the estimation of pressure at the face of the transducer, with simultaneously measured values, taken during the process of parameter evaluation. Similar graphs are given for displacement in FIG. 7. This level of agreement was found suitable for the operation of a thermoacoustic refrigerator of the type in the exemplary embodiment, but it is appreciated that other terms could be included, were this to be found necessary for a particular implementation of the thermoacoustic refrigerator, and selection of type of operating condition.

Figure 8:
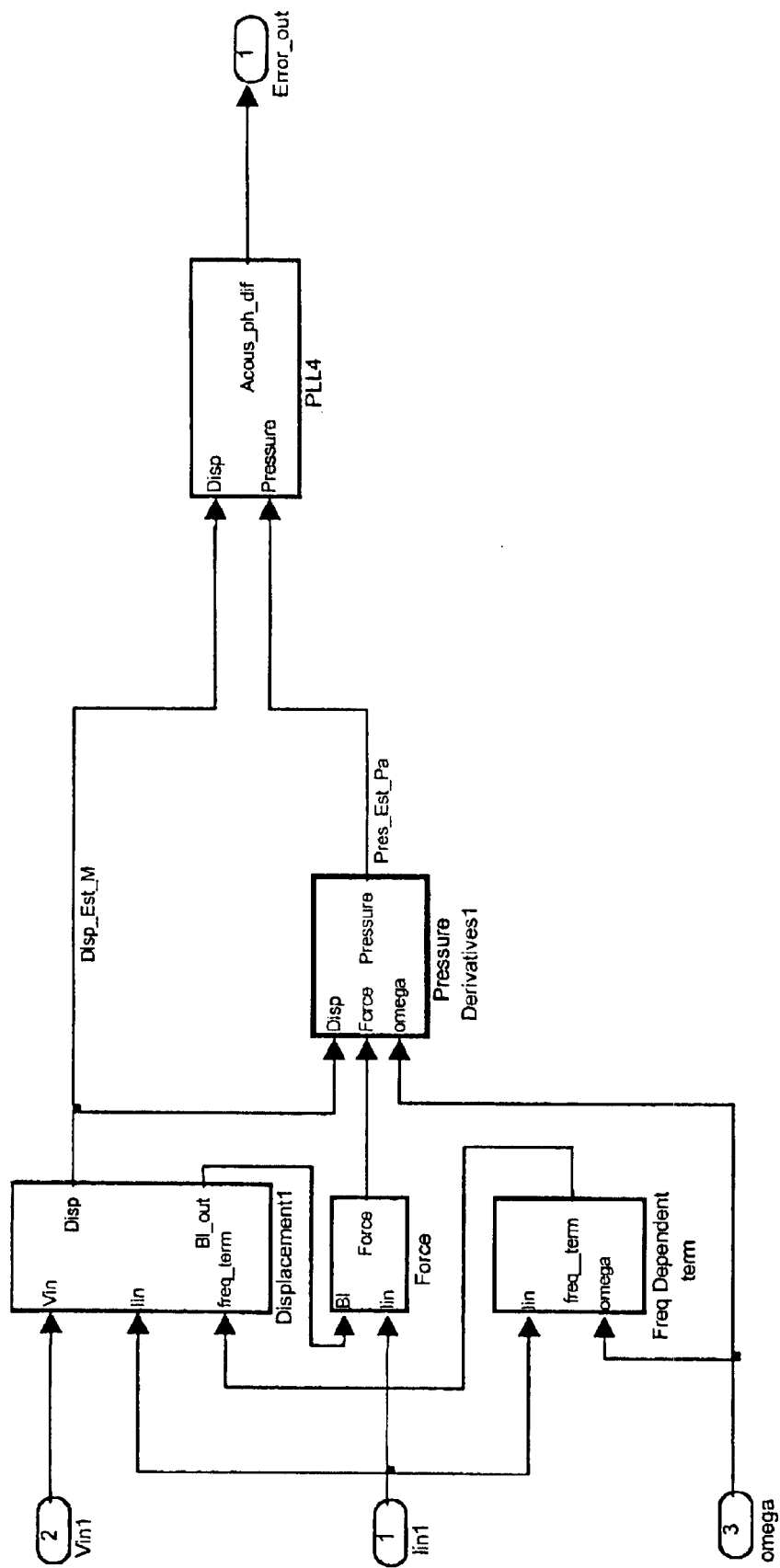
FIG. 8 illustrates a process flow Block diagram for sensorless control of a thermoacoustic device as according to the invention.

FIG. 8 provides an overview of a process flow diagram for the method of sensorless control of the thermoacoustic device as according to the invention.

Figure 9:
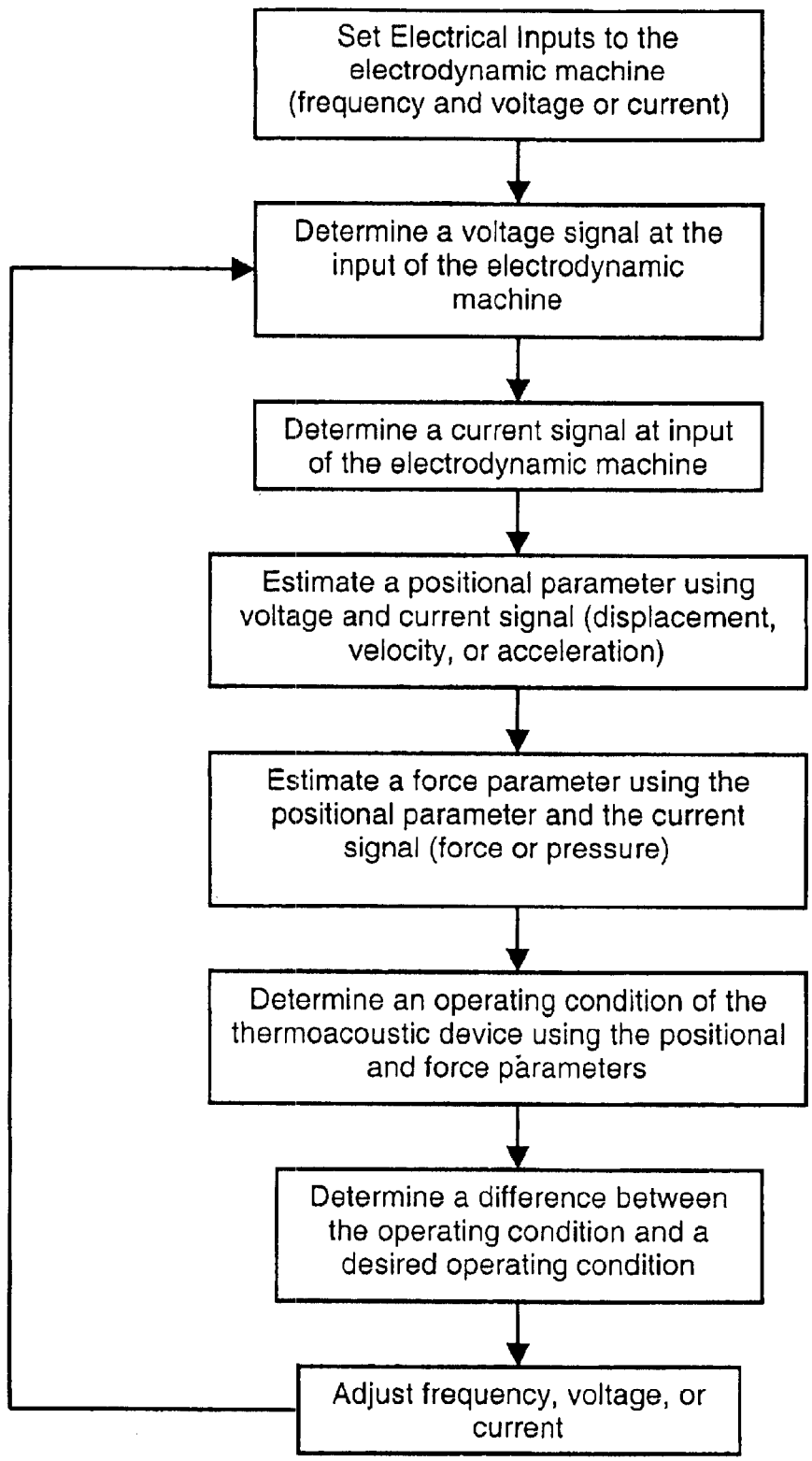
FIG. 9 illustrates a flow chart of one embodiment of a method of sensorless control according to the present invention.

FIG. 9 generally summarizes a method for sensorless control of a thermoacoustic device, and depicts the method as a flowchart. As shown, the first step is to set the electrical inputs to the electrodynamic machine. This typically means setting the voltage or current, and the frequency. Typically voltage and frequency are set, and current responds in a manner governed by the characteristics of the load and the parameters of the electrodynamic machine. Next, a current and voltage signal are determined at the inputs of the electrodynamic machine. One of these signals usually may be determined directly from the power supply, since it was set, while the other signal is measured. Alternatively both may be measured. The voltage and current signal are used to estimate a positional parameter, such as displacement. This is typically done using a mathematical model of the machine. The current signal and the positional parameter are then used to estimate a force parameter, such as pressure. An operating condition is then determined using at least the positional and force parameters. In one example, the operating condition is the phase relationship between displacement and pressure. This phase angle is proportional to the cycle averaged product of these two parameters. If they are 90 degrees out of phase, the product will be zero. In this same example, the desired operating condition is that the displacement and pressure are 90 degrees out of phase, which corresponds to a zero product. A difference between the desired operating condition, a zero product, and the actual operating condition, is then determined, and the frequency, current or frequency are adjusted to decrease the difference. The process is repeated as necessary. For some situations, the operating condition may depend on additional parameters, such as the electrical inputs, as well as the force and positional parameters.

Figure 10:
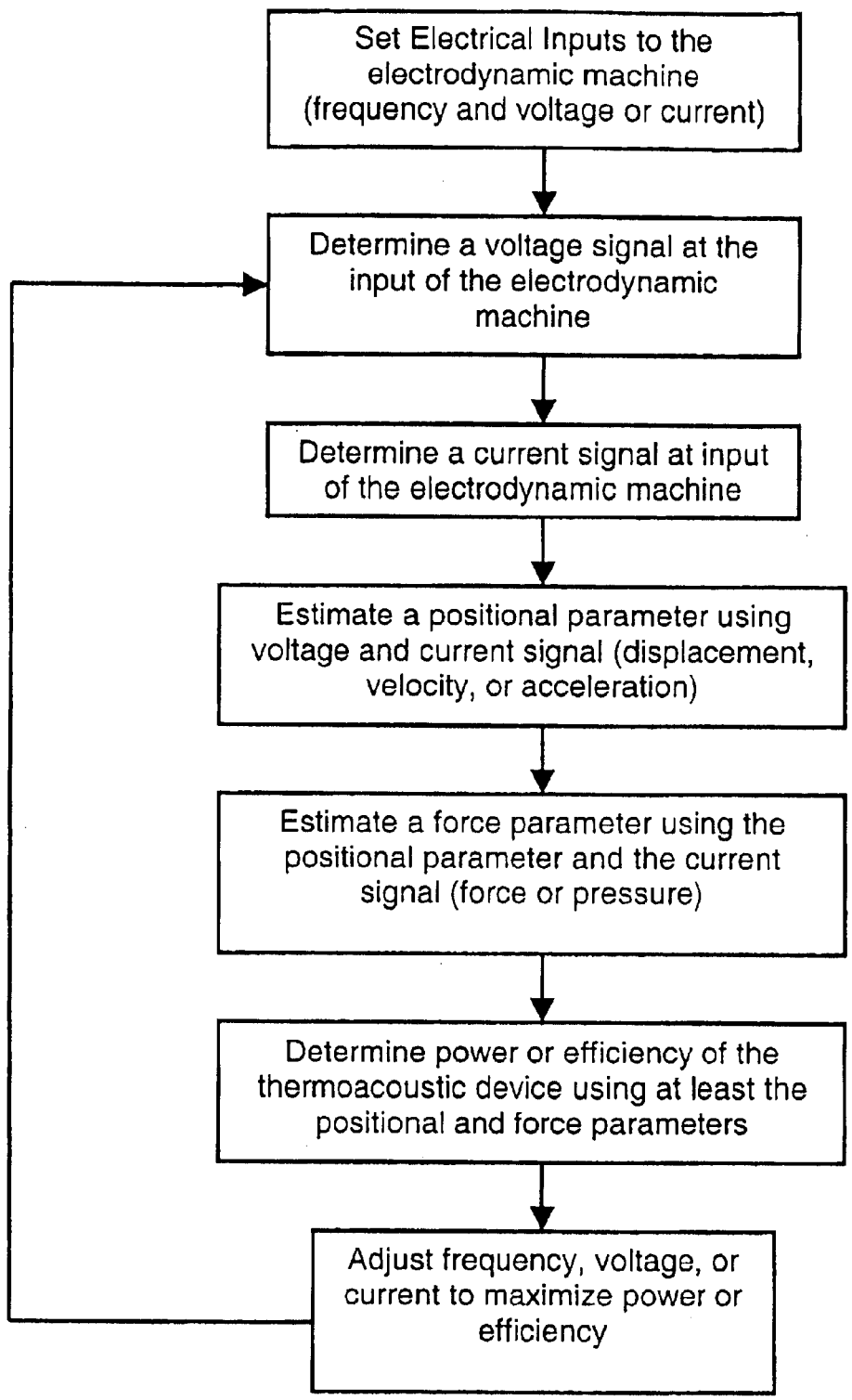
FIG. 10 illustrates a flow chart of another embodiment specifically focused on maximizing efficiency or power.

FIG. 10 provides a flow chart for a method more specific to maximizing efficiency or power. This is similar to the above example, except that operating condition is power or efficiency and the inputs are adjusted to maximize the power or efficiency, typically within certain performance limits (maximum current, voltage, displacement, etc.). Determination of the power may be made based on the force and positional parameter. It may be calculated by multiplying force times velocity and time averaging this product over a cycle. Knowledge of the electrical inputs may be desirable to avoid exceeding the current or voltage capabilities of the machine. Also, maximum displacement, or other positional or force parameters may have to be limited to avoid damage. Determination of efficiency requires using the electrical inputs in addition to the force and positional parameters. The efficiency is the power to the load (product of force and velocity) divided by the electrical input power (product of voltage and current time averaged over a cycle). Again, limits may be placed on force or positional parameters, or electrical inputs.

For cases wherein it is desirable to calculate maximum power or maximum efficiency, and for cases in which the load is something other than a thermoacoustic device, optimum selection of the dynamical parameters to be estimated, may be different than those described explicitly in the equations above. For purposes of illustration, it may be desirable to select among the dynamical parameters to estimate force and velocity, for operating points which are composed of these parameters. In such a case an example of an expression to estimate the velocity, $\hat{V}_{pist}$, is given by:

$$\hat{V}_{pist} = \frac{d\hat{x}}{dt} = \frac{1}{Bl}\left(v_t - iR_e - L_e\frac{di}{dt}\right)$$

and an example of the force on the load, $\hat{f}_{load}$, is given by:

$$\hat{f}_{load} = Bli - M_m\frac{d\hat{V}_{pist}}{dt^2} - R_m\hat{V}_{pist} - K\int \hat{V}_{pist}dt$$

where the parameters, are as noted above.

The control techniques described herein can be applied to permanent magnet, moving coil, and other reciprocating linear electrodynamic drive machines and has utility for cases in which it is desirable to estimate the magnitude, and phase relationship between the force and displacement, as well as to adjust the relationship by means of adjusting the operating frequency. It is appreciated that this approach is not limited to thermoacoustic refrigeration.

It should also be noted, that while the description herein refers to an input to the linear machine which has a single frequency (i.e. a pure sinusoid) the method is sufficiently general, such that the input excitation to the linear motor may be only approximately sinusoidal (i.e. a pulse width modulated signal, typical of the commercially available systems for controlling input frequency to rotary motors) as long as the current and voltage are suitably filtered or conditioned, for use in estimating the dynamical parameters.

Another example of an application in which it is desirable to track an acoustic resonance is in the field of sonic gas analysis, wherein one can make use of the fact that the sound speed in a known gas changes with the addition of contaminants, and that when the gas is contained within a fixed wavelength resonator, the sound speed can be obtained from the resonance frequency. In the past this tracking has been accomplished with sensors, or separate microphones within the resonator, which this invention eliminates. In this case, the directly tracked frequency can provide information regarding changes in the mean molecular weight of constituents within the acoustic resonator. The present invention may more broadly be considered as a method for sensorlessly controlling a system including a reciprocating linear electrodynamic machine that harmonically drives a displaceable portion of a load device. With the exemplary thermoacoustic device, the electrodynamic machine is a linear motor, the load device is the thermoacoustic refrigeration portion, and the displaceable portion is the piston.

It is also possible to implement the position estimation in a phasor form. In such case, two harmonic signals at the commanded frequency are generated, with a 90-degree phase relationship between the two. Implementation of the equations then would be possible without use of numerical or analog integration and differentiation, and explicit reference to complex quantities.

It is also clear that one could obtain the piston position via means other than the estimation used here and still apply the methods herein to obtain the magnitude of the force or pressure only, in order to provide information suitable for control of the linear electrodynamic machine. In this situation, the method as shown in FIG. 9 would be modified such that the "estimate a positional parameter" step is replaced with a "measure a positional parameter step". The step of determining the voltage signal may become unnecessary since the force parameter may be estimated based on the measured, or otherwise determined, positional parameter and current. The voltage signal may be used for other reasons, as needed. This version of the present invention would still provide benefits since the force parameter could be estimated instead of measured, thereby eliminating one sensor.

It is recognized that for particular control applications, it may be desirable to use operating points other than the phase between the force and positional parameters, or efficiency, or maximum power. In some applications it may be desirable, for example, to have the ratio of a force parameter and a positional parameter be defined as the operating condition. As a specific case of the latter, where the ratio is force divided by velocity, this operating condition would be the mechanical impedance. Control could be implemented, to tune the electrical excitation, so as to achieve a particular value of impedance, to reach a maximum value, or a minimum value. It is further recognized, that other operating conditions can be mathematically defined, which may be informed by the value of a force parameter and a positional parameter, and sensorless estimation of these parameters permits control to any such operating point, assuming it lies within physical possibilities of the combined system of the machine and the load.

While the invention has been particularly shown and described with reference to preferred embodiments thereof, it will be understood by those skilled in the art that various alterations in form and detail may be made therein without departing from the spirit and scope of the invention.

We claim:

1. A method for sensorlessly controlling the operation of a thermoacoustic device including a linear electrodynamic machine communicating with a load device, said method comprising the steps of:

providing a thermoacoustic device including a linear electrodynamic machine communicating with a load device through a piston;

setting electrical inputs to the electrodynamic machine, the electrical inputs including frequency and either voltage or current;

determining a voltage signal at an input of the electrodynamic machine;

determining a current signal at the input of the electrodynamic machine;

estimating a positional parameter of the piston using the voltage and current signals, the positional parameter being selected from the group consisting of displacement, velocity, and acceleration of the piston;

estimating a force parameter of the load device using the positional parameter and the current signal, the force parameter being selected from the group consisting of force and pressure on the piston;

using the positional parameter and the force parameter to determine at least one operating condition of the thermoacoustic device, the operating condition being the phase angle between the positional parameter and the force parameter;

determining a difference between the at least one operating condition and a desired operating condition; and adjusting at least one electrical input to the electrodynamic machine so as to reduce the difference, the adjusted input being one of frequency, current, and voltage.

2. The method of claim 1, further comprising repeating the determining, estimating and adjusting steps until the difference between the at least one operating condition and the desired operating condition is minimized.

3. The method of claim 1, further comprising developing a mathematical model of the electrodynamic machine, the estimating steps comprising using the mathematical model to perform the estimating.

4. The method of claim 1, wherein determining the current signal comprises measuring the current signal and filtering the measured current signal.

5. The method of claim 4, wherein the step of measuring and filtering the current imposes a time delay on the current signal, the method further comprising the step of delaying the voltage signal by a time-delay substantially equal to the time delay on the current signal.

6. The method of claim 1, wherein determining the voltage signal comprises measuring the voltage signal and filtering the measured voltage signal.

7. The method of claim 6, wherein the step of measuring and filtering the voltage signal imposes a time delay on the voltage signal, the method further comprising the step of delaying the current signal by a time-delay substantially equal to the time delay on the voltage signal.

8. The method of claim 1, wherein the steps of determining the voltage and current signals comprise measuring the voltage and current signals and filtering the measured voltage and current signals.

9. The method of claim 8, wherein the filtering step comprises filtering the voltage and current signals using substantially identical filters.

10. The method of claim 1, wherein the desired operating condition is a 90 degree phase angle between the displacement of the piston and the pressure on the piston.

11. The method of claim 1, wherein the desired operating condition is an in-phase relationship between the velocity of the piston and the pressure on the piston.

12. The method of claim 1, further comprising the step of providing a control device wherein the control device performs the steps of:

determining a difference between the at least one operating condition and a desired operating condition; and adjusting at least one electrical input to the electrodynamic machine so as to reduce the difference.

13. The method of claim 12, wherein the control device is a phase locked loop.

14. The method of claim 1, wherein the desired operating condition corresponds to an acoustic resonance of the thermoacoustic device.

15. The method of claim 1, further comprising setting limits on at least one of the electrical inputs, positional parameters or force parameters, the adjusting step comprising adjusting the at least one electrical input so as not to violate the at least one limit.

16. The method of claim 1, wherein the step of estimating the positional parameter comprises estimating the displacement, $\hat{x}$, of the piston according to equation $$\hat{x} = \frac{1}{Bl}\left[\int (v_t - iR_e)dt - L_e i\right].$$

wherein Bl is the transduction coefficient,
$v_t$ is the voltage signal at the terminals of the machine,
i is the current,
Re is the stator winding resistance, and
Le is the self inductance of the stator windings.

17. The method of claim 1, wherein the step of estimating the force parameter comprises estimating the pressure, $\hat{p}_a$, according to equation $$\hat{p}_a = \frac{1}{A}\left(Bli - M_m\frac{d^2\hat{x}}{dt^2} - R_m\frac{d\hat{x}}{dt} - K_m\hat{x}\right).$$

wherein Bl is the transduction coefficient,
i is the current,
Mm is the actuator moving mass,
$\hat{x}$ is the estimated displacement of the piston,
Rm is the damping constant,
Km is the spring constant, and
A is the area of a piston in communication with the load device.

18. The method of claim 1, wherein the step of estimating the positional parameter comprises estimating the displacement, $\hat{x}$, of the piston according to equation $$\hat{x} = \frac{1}{Bl}\left[\int (v_1 - iR_e - \omega L_{imag} i)dt - L_e i + k_1 i^3 + k_2 i^5\right].$$

wherein Bl is the transduction coefficient,
$v_t$ is the voltage signal at the terminals of the machine,
i is the current,
Re is the stator winding resistance,
$L_{imag}$ is the imaginary component of the inductance of the windings,
ω is the operating frequency in radians/sec,
Le is the self inductance of the stator windings, and
$k_1$ and $k_2$ are small, non-complex constants.

19. A method for sensorlessly controlling the operation of a thermoacoustic device including a linear electrodynamic machine communicating with a load device, said method comprising the steps of:
providing a thermoacoustic device including a linear electrodynamic machine communicating with a load device through a piston;
setting electrical inputs to the electrodynamic machine, the electrical inputs including frequency and either voltage or current;
determining a voltage signal at an input of the electrodynamic machine;
determining a current signal at the input of the electrodynamic machine;
estimating a positional parameter of the piston using the voltage and current signals, the positional parameter being selected from the group consisting of displacement, velocity, and acceleration of the piston;
estimating a force parameter of the load device using the positional parameter and the current signal, the force parameter being selected from the group consisting of force and pressure on the piston;
using at least the positional parameter and the force parameter to determine at least one operating condition of the thermoacoustic device, the operating condition being selected from the group consisting of efficiency and power; and
adjusting at least one electrical input to the electrodynamic machine so as to maximize the operating condition, the adjusted input being one of frequency, current, and voltage.

20. The method of claim 19, further comprising repeating the determining, estimating and adjusting steps until the difference between the at least one operating condition and the desired operating condition is minimized.

21. The method of claim 19, further comprising developing a mathematical model of the electrodynamic machine, the estimating steps comprising using the mathematical model to perform the estimating.

22. The method of claim 19, wherein determining the current signal comprises measuring the current signal and filtering the measured current signal.

23. The method of claim 22, wherein the step of measuring and filtering the current imposes a time delay on the current signal, the method further comprising the step of delaying the voltage signal by a time-delay substantially equal to the time delay on the current signal.

24. The method of claim 19, wherein determining the voltage signal comprises measuring the voltage signal and filtering the measured voltage signal.

25. The method of claim 24, wherein the step of measuring and filtering the voltage signal imposes a time delay on the voltage signal, the method further comprising the step of delaying the current signal by a time-delay substantially equal to the time delay on the voltage signal.

26. The method of claim 19, wherein the steps of determining the voltage and current signals comprise measuring the voltage and current signals and filtering the measured voltage and current signals.

27. The method of claim 26, wherein the filtering step comprises filtering the voltage and current signals using substantially identical filters.

28. The method of claim 19, wherein the operating condition is power, the positional parameter is velocity, the force parameter is force, and the power is determined by multiplying the velocity by the force and time averaging the product over a cycle.

29. The method of claim 19, wherein the operating condition is efficiency, the positional parameter is velocity, and the force parameter is force, the operating condition determining step further using the voltage and current signals, the efficiency being determined by dividing the product of the force and velocity by the time averaged product of the voltage and current signals.

30. The method of claim 19, further comprising the step of providing a control device wherein the control device performs the step of
adjusting the at least one electrical input to the electrodynamic machine so as to maximize the operating condition.

31. The method of claim 19, further comprising setting limits on at least one of the electrical inputs, positional parameters or force parameters, the adjusting step comprising adjusting the at least one electrical input so as not to violate the limit.

32. The method of claim 19, wherein the step of estimating the positional parameter comprises estimating the velocity, $\hat{V}_{pist}$ of the piston according to equation $$\hat{V}_{pist} = \frac{1}{Bl}\left(v_t - iR_e - L_e\frac{di}{dt}\right)$$

wherein Bl is the transduction coefficient,
$v_t$ is the voltage signal at the terminals of the machine,
i is the current,
Re is the stator winding resistance, and
Le is the self inductance of the stator windings.

33. The method of claim 19, wherein the step of estimating the force parameter comprises estimating the force on the load, $\hat{f}_{load}$, according to equation $$\hat{f}_{load} = Bli - M_m\frac{d\hat{V}_{pist}}{dt^2} - R_m\hat{V}_{pist} - K\int\hat{V}_{pist}dt$$

wherein Bl is the transduction coefficient,
i is the current,
Mm is the actuator moving mass,
$\hat{x}$ is the estimated displacement of the piston,
Rm is the damping constant,
Km is the spring constant, and
A is the area of a piston in communication with the load device.

34. The method of claim 19, wherein the step of estimating the positional parameter comprises estimating the displacement, $\hat{x}$, and the velocity, $\hat{V}_{pist}$ of the piston according to equations:

$$\hat{x} = \frac{1}{Bl}\left[\int(v_1 - iR_e - \omega L_{imag}i)dt - L_e i + k_1 i^3 + k_2 i^5\right]$$

and, $$\hat{V}_{pist} = \frac{d\hat{x}}{dt}$$

wherein Bl is the transduction coefficient,
$v_t$ is the voltage signal at the terminals of the machine,
i is the current,
Re is the stator winding resistance,
$L_{imag}$ is the imaginary component of the inductance of the windings,
ω is the operating frequency in radians/sec,
Le is the self inductance of the stator windings, and
$k_1$ and $k_2$ are small, non-complex constants.

35. A method for sensorlessly controlling the operation of a system including a reciprocating linear electrodynamic machine harmonically driving a displaceable portion of a load device, said method comprising the steps of:
providing a system including a linear electrodynamic machine harmonically driving a displaceable portion of a load device;
setting electrical inputs to the electrodynamic machine, the electrical inputs including frequency and either voltage or current;
determining a voltage signal at an input of the electrodynamic machine;
determining a current signal at the input of the electrodynamic machine;
estimating a positional parameter of the load device using the voltage and current signals, the positional parameter being selected from the group consisting of displacement, velocity, and acceleration of the displaceable portion;
estimating a force parameter of the load device using the positional parameter and the current signal, the force parameter being selected from the group consisting of force and pressure;
using at least the positional parameter and the force parameter to determine at least one operating condition of the system, the operating condition being selected from the group consisting of efficiency, power, phase between the positional parameter and the force parameter, and a ratio between the positional parameter and the force parameter;
determining a difference between the operating condition and a desired operating condition; and
adjusting at least one electrical input to the electrodynamic machine so as to reduce the difference, the adjusted input being one of frequency, current, and voltage.

36. The method of claim 35, further comprising repeating the determining, estimating and adjusting steps until the difference between the at least one operating condition and the desired operating condition is minimized.

37. The method of claim 35, further comprising developing a mathematical model of the electrodynamic machine, the estimating steps comprising using the mathematical model to perform the estimating.

38. The method of claim 35, wherein the load device is a thermoacoustic device, and the desired operating condition is an acoustic resonance of the thermoacoustic device.

39. The method of claim 35, wherein determining the current signal comprises measuring the current signal and filtering the measured current signal.

40. The method of claim 39, wherein the step of measuring and filtering the current imposes a time delay on the current signal, the method further comprising the step of delaying the voltage signal by a time-delay substantially equal to the time delay on the current signal.

41. The method of claim 35, wherein determining the voltage signal comprises measuring the voltage signal and filtering the measured voltage signal.

42. The method of claim 41, wherein the step of measuring and filtering the voltage signal imposes a time delay on the voltage signal, the method further comprising the step of delaying the current signal by a time-delay substantially equal to the time delay on the voltage signal.

43. The method of claim 35, wherein the steps of determining the voltage and current signals comprise measuring the voltage and current signals and filtering the measured voltage and current signals.

44. The method of claim 43, wherein the filtering step comprises filtering the voltage and current signals using substantially identical filters.

45. The method of claim 35, wherein the desired operating condition is a 90 degree phase angle between the displacement and the pressure.

46. The method of claim 35, wherein the step of estimating the positional parameter comprises estimating the displacement, $\hat{x}$, according to equation $$\hat{x} = \frac{1}{Bl}\left[\int (v_t - iR_e)dt - L_e i\right].$$

wherein Bl is the transduction coefficient,
$v_t$ is the voltage signal at the terminals of the machine,
i is the current, Re is the stator winding resistance, and
Le is the self inductance of the stator windings.

47. The method of claim 35 wherein the step of estimating the force parameter comprises estimating the pressure, $\hat{p}_a$, according to equation $$\hat{p}_a = \frac{1}{A}\left(Bli - M_m\frac{d^2\hat{x}}{dt^2} - R_m\frac{d\hat{x}}{dt} - K_m\hat{x}\right).$$

wherein Bl is the transduction coefficient,
i is the current,
Mm is the actuator moving mass,
$\hat{x}$ is the estimated displacement of the displaceable portion,
Rm is the damping constant,
Km is the spring constant, and
A is the area of the displaceable portion.

48. The method of claim 35, wherein the step of estimating the positional parameter comprises estimating the displacement, $\hat{x}$, of the piston according to equation $$\hat{x} = \frac{1}{Bl}\left[\int (v_1 - iR_e - \omega L_{imag} i)dt - L_e i + k_1 i^3 + k_2 i^5\right].$$

wherein Bl is the transduction coefficient,
$v_t$ is the voltage signal at the terminals of the machine,
i is the current,
Re is the stator winding resistance,
$L_{imag}$ is the imaginary component of the inductance of the windings,
ω is the operating frequency in radians/sec,
Le is the self inductance of the stator windings, and
$k_1$ and $k_2$ and small, non-complex constants.

49. The method of claim 35, further comprising setting limits on at least one of the electrical inputs, positional parameters or force parameters, the adjusting step comprising adjusting the at least one electrical input so as not to violate the limit.

50. A method for controlling the operation of a system including a reciprocating linear electrodynamic machine harmonically driving a displaceable portion of a load device, said method comprising the steps of:

providing a system including a linear electrodynamic machine harmonically driving a displaceable portion of a load device;

setting electrical inputs to the electrodynamic machine, the electrical inputs including frequency and either voltage or current;

determining a current signal at the input of the electrodynamic machine;

determining a positional parameter of the load device, the positional parameter being selected from the group consisting of displacement, velocity, and acceleration of the displaceable portion;

estimating a force parameter of the load device using the positional parameter and the current signal, the force parameter being selected from the group consisting of force and pressure;

using at least the positional parameter and the force parameter to determine at least one operating condition of the system, the operating condition being selected from the group consisting of efficiency, power and phase between the positional parameter and the force parameter;

determining a difference between the operating condition and a desired operating condition; and adjusting at least one electrical input to the electrodynamic machine so as to reduce the difference, the adjusted input being one of frequency, current, and voltage.

51. The method of claim 50, wherein the determining the positional parameter step comprises measuring the positional parameter.

* * * * *

UNITED STATES PATENT AND TRADEMARK OFFICE
CERTIFICATE OF CORRECTION

PATENT NO. : 6,883,333 B2
APPLICATION NO. : 10/706550
DATED : April 26, 2005
INVENTOR(S) : Hoffmann et al.

It is certified that error appears in the above-identified patent and that said Letters Patent is hereby corrected as shown below:

Col. 1, lines 13-15 insert the following:

--STATEMENT OF GOVERNMENT SUPPORT

This invention was made with government support under Contract No. N00039-97-D-0042, Delivery Order #111, awarded by the Naval Sea Systems Command (NAVSEA). The Government has certain rights in the invention.--

Signed and Sealed this
Twenty-fifth Day of June, 2013

Teresa Stanek Rea
*Acting Director of the United States Patent and Trademark Office*